United States Patent [19]
Karlen

[11] 3,955,110
[45] May 4, 1976

[54] JUNCTION CONNECTION PIECE FOR HOLLOW STRANDS OF THE STATOR CONDUCTOR BARS OF A DYNAMO-ELECTRIC MACHINE

[75] Inventor: Urs Karlen, Fislisbach, Switzerland

[73] Assignee: BBC Brown Boveri & Company Limited, Baden, Switzerland

[22] Filed: Feb. 3, 1975

[21] Appl. No.: 546,419

[30] Foreign Application Priority Data
Mar. 15, 1974 Switzerland.......................... 3608/74

[52] U.S. Cl..................................... 310/54; 310/59
[51] Int. Cl.² .......................................... H02K 9/16
[58] Field of Search ............................. 310/52–65, 310/260, 270

[56] References Cited
UNITED STATES PATENTS
2,929,943  3/1960  Richardson et al............... 310/54 X
3,510,700  5/1970  Grinchenko et al.............. 310/59 X

*Primary Examiner*—Donovan F. Duggan
*Attorney, Agent, or Firm*—Pierce, Scheffler & Parker

[57] ABSTRACT

A fluid cooled stator winding of a dynamo-electrical machine is comprised of stator bars each composed of a combination of solid and hollow conductor strands. The end portions of the hollow conductor strands protrude beyond the ends of the solid conductor strands of the bar and are grouped together in a conductor bundle on which is cast a body of synthetic resin that forms a nipple for connection of a hose to the bundle of hollow conductor strands for circulation of the fluid coolant.

4 Claims, 1 Drawing Figure

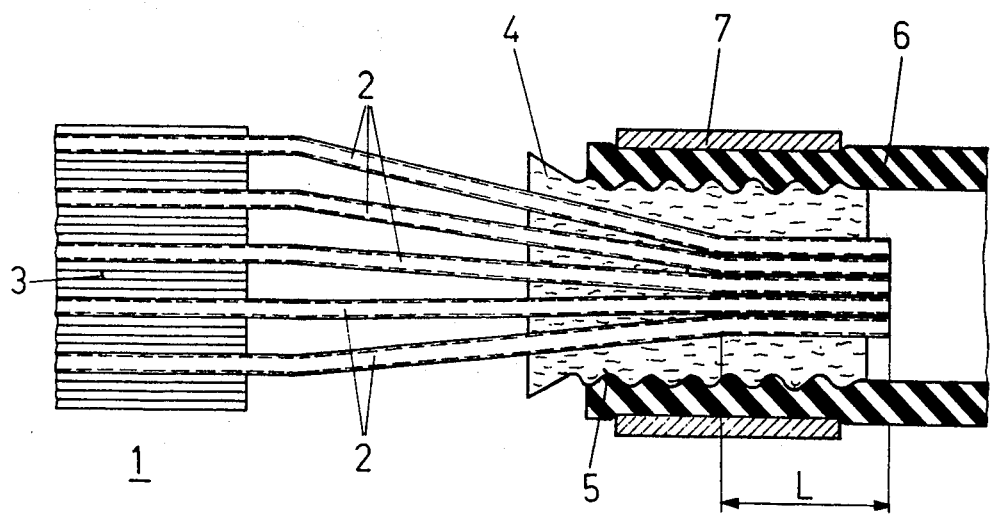

JUNCTION CONNECTION PIECE FOR HOLLOW STRANDS OF THE STATOR CONDUCTOR BARS OF A DYNAMO-ELECTRIC MACHINE

The present invention concerns an improvement in a connecting piece for the hollow conductor strands of the stator bars of a dynamo-electrical machine, the stator winding of which is liquid-cooled.

A method is known in the case of liquid-cooled stator windings whereby the hollow, internally cooled conductor strands, which are located between a number of thin, solid conductor strands, are joined outside the stator by means of cap rings and header boxes directing the inlet and outlet flow of the coolant.

The ends of hollow conductors of copper are often hard-soldered to a baseplate which in turn is soldered into a water box located at the end of the stator. When hollow conductors of steel are used, these are welded into a connecting piece which directs the coolant flow. In both instances the methods of manufacturing the necessary connections and seals are very costly, an inductive heating plant being required for the hard-soldering process, and micro-plasma equipment for welding. These are specialized machines which can be operated only by skilled personnel. To be able to couple the hollow conductors to an insulating hose, each joint requires a special nipple to which the hose is attached by means of a threaded sleeve, or the like.

The object of the invention is to create a connecting piece for the hollow conductor strands of the stator bars of a dynamo-electrical machine, the stator winding of which is liquid-cooled, such that the hollow conductor strands can very easily be connected to each other and to a hose or water box.

This object is achieved in that the connecting piece consists of moulded resin which surrounds the protruding free ends of the hollow conductor strands and which at the same time also serves as a nipple for connecting a hose to the hollow conductor strands.

The particular advantage of the invention is that, instead of a large number of individual sealing points, which hitherto was determined by the number of hollow conductors per bar, only one common connecting piece is required for all the hollow conductors of one winding bar. Further simplification is achieved in that the connecting piece can also be used as a hose-connecting nipple.

The invention will now be explained more fully with reference to an example as illustrated in the accompanying drawing which shows a longitudinal section through a connecting piece in accordance with the invention.

With reference now to the drawing, the end of a stator bar 1 comprises the hollow conductor strands 2 and the intervening solid conductor strands 3. This is a stator bar for a dynamo-electrical machine with a water-cooled stator winding. The ends of the hollow conductors 2 protruding from the stator bar 1 are formed into a bundle around which a synthetic resin is cast to create a connecting piece 4.

Before the synthetic resin, for example Araldite B with hardener 901, is cast round the hollow conductors, it is of great benefit to join the bundled hollow conductors together, by means of hard solder in the case of copper conductors, or by welding if the hollow conductors are of steel. The protruding free ends of the hollow conductors 2 should preferably extend slightly beyond the moulded-resin connecting piece 4 in order to prevent the resin from entering the hollow conductors. The distance L is that part in which the ends of the hollow conductors run parallel, and in addition are joined together by hard-soldering or welding.

The complete moulded connecting piece 4 is of cylindrical shape, and its outer surface can also be provided with transverse grooves 5. This has the added advantage that if the connecting piece 4 is to serve as a nipple for a hose 6, which is fixed to the nipple by means of a clamping ring 7, the transverse grooves 5 ensure that the hose is firmly fixed to the nipple.

I claim:

1. In a dynamo-electrical machine of the type wherein the stator winding thereof is comprised of stator bars composed of a combination of solid and hollow strands through which a fluid coolant is circulated and wherein the end portions of the hollow conductor strands of each bar protrude beyond the ends of the solid conductor strands thereof, the improvement wherein said protruding end portions of the hollow conductor strands are grouped together in a conductor bundle and which latter is encased in a cast-on body of synthetic resin that serves as an electrically insulating nipple for connection of the bundle of hollow conductor strands to fluid conduction means for circulation of the fluid coolant.

2. The invention as defined in claim 1 wherein the ends of the hollow conductor strands project beyond the end of said cast-on resin body to prevent the resin from entering the ends of the hollow strands.

3. The invention as defined in claim 1 wherein the exterior surface of said cast-on resin body is provided with a series of transverse grooves engaging the interior surface of a hose which serves as said fluid conduction means.

4. The invention as defined in claim 1 wherein the end portions of the hollow conductor strands extend parallel to each other to establish the bundle and are secured together.

* * * * *